3,034,904
METHOD FOR PROTECTING APPLES
Morton Kleiman, 5744 N. Western Ave., Chicago, Ill.
No Drawing. Filed Sept. 9, 1960, Ser. No. 54,848
6 Claims. (Cl. 99—154)

This invention relates to an improved method for controlling the development of storage scald of apples, and more particularly it relates to an improved method of applying and producing extremely minute surface residues of diphenylamine on apples to prevent, control and/or retard the development of apple scald. It also relates to new compositions for utilizing the improved method for controlling the development of storage scald of apples.

Apple scald is a physiological disfunction which occurs in many varieties of apples at some time after harvesting the fruit, and in some seasons it may be particularly severe on fruit which has been placed in refrigerated storage, although the occurrence of this physiologic disorder is not strictly limited to fruit which has been stored at cold temperatures. It may also occur on fruit which has been held at room or ambient temperatures. Apple storage scald is characterized by a superficial browning of the apple surface affecting a few layers of cells directly below the cuticle. The unsightly appearance of the scalded apples lowers their market value, and the damage to the skin increases susceptibility to invasion by fungi. While scald affects most varieties of apples customarily held in refrigerated storage, some varieties are noticeably more susceptible than others. Rhode Island Greening, Northwestern Greening, Cortland, Stayman, Rome and Grimes are among the varieties highly susceptible to scald. Other varieties may be fairly resistant, yet in some seasons they are also subject to the disorder.

The exact nature of this disorder is not fully known, notwithstanding the fact that extensive studies have been made of the various factors which are believed possible to play a part in its development. Many variables relating to growing conditions of the fruit, nutrition of the fruit trees, conditions of storage, time of picking, etc. have been examined in efforts to discover the causes and nature of scald, extending back over the past thirty or more years. Substantially all of these efforts have been fruitless, and to date all hypotheses as to the causes of scald have had to be discarded as untenable, so that only empirical, highly unreliable and essentially ineffective remedies have heretofore been used by growers and storagers of apples.

The magnitude of this problem becomes more apparent upon consideration of the facts that the occurrence of this disfunction is entirely unpredictable both as to its latent presence and as to the severity of the outbreak. It is not possible to determine in advance by any known tests or procedures whether or not scald will occur, and it is only after removing the fruit from storage and holding it or shipping it through the normal channels of commerce that the scald malady shows up. Thus the value of the entire contents of a cold storage fruit warehouse may be in jeopardy with no known remedy and with no possible way of predicting whether or not the fruit is storable at the time of placing it in storage, and whether or not the fruit will be salable shortly after removing it from storage. Since storage is basic to the apple industry and is necessary for the orderly and profitable use of each season's crop, it can be seen that scald presents a problem of great magnitude and importance, and that any methods whereby its very costly losses can be controlled is of tremendous nutritional and economic significance.

In recent years, it was shown in laboratory experiments that the application of a film of diphenylamine to apples, in the manner next described, reduced somewhat the incidence of scald. In these laboratory investigations, the chemical was dissolved in ethyl alcohol, a wetting agent was occasionally added, and the solution was poured into water in order to provide a dilute aqueous medium with which to treat the apples. These colloidal solutions containing a significant proportion of alcohol were then used to spray the fruit either before or after harvest, or the fruit was dipped in the solution for a short interval of time; the fruit was next allowed to dry or placed wet in cold storage.

Numerous shortcomings and disadvantages are inherent in this laboratory procedure which substantially eliminate its utility for practical commercial usage. Thus, if this laboratory method were sought to be applied on a commercial scale, the high cost of the alcohol used as solvent would be objectionable. Also, if used on a large scale, the alcohol evaporating in usage would present both a fire hazard and a health hazard to those who have to handle the solutions, in particular the vapor of the alcohol producing a soporific effect upon the workers. Moreover, the solutions thus prepared for dipping or spraying the fruit are not satisfactory except for very small scale tests, because, as the alcohol solvent evaporates, there ensues formation of numerous agglomerates of the chemical, which is water-insoluble, removing it from solution and destroying its effectiveness for the purpose intended, and clogging spray nozzles and application equipment. When the relative amount of alcohol is increased in an attempt to overcome these deficiencies, fruit injury results. As a consequence of these and other problems, the laboratory method heretofore used experimentally has not met the test of practicality for commercial use.

Attempts to overcome the above-described deficiencies of the laboratory method by dissolving the diphenylamine in some other organic solvent and application of such diphenylamine solutions to the fruit have also failed. The use of other solvents still involves objectionably high costs, as well as potential fire and health hazards. Moreover, like alcohol, other organic solvents produce undesirable deleterious effects on the appearance and keeping qualities of the fruit, promoting undesirable absorption of the solution within the fruit, and destroy the palatability and the wholesomeness of the fruit. A further very major deterrent to the use of other organic solvents is the fact that governmental public health agencies have ruled that most organic materials which might be suitable as solvents have to be regarded as potentially deleterious or poisonous substances until their safety for use upon food products can be adequately established.

It is the object of the present invention to provide an improved method for establishing and maintaining a scald preventive residue of diphenylamine on apples on a commercial scale which avoids the aforementioned difficulties. Further objects and advantages of my invention, hereinafter described and illustrated in detail, will become apparent to those skilled in the art.

The diphenylamine employed in accordance with my invention is preferably material of very high purity; in general, it should be over 99 mole percent pure and it should contain less than 0.1 percent by weight of aniline as an impurity. Material of less rigid purity specifications can be employed and the impurities may be considered simply as inert, diluting ingredients. However such is not in accordance with the preferred practice of my invention, particularly since the presence of other impurities may have some unpredictable deleterious effects upon the fruit to be treated and since such impurities may introduce complicating toxicity aspects not inherent in the practice of the invention.

It was unexpectedly found according to the invention that improved fruit protection as well as improved and practical efficiency of application could be achieved by applying the diphenylamine to the fruit to be protected in the form of a suspension or emulsion in water with water as the continuous phase, the diphenylamine in finely divided state forming the disperse phase, in substantially the complete absence of any added organic solvent. The superior effectiveness and practicability of such application are quite surprising and unexpected in view of the extreme insolubility of diphenylamine in water and the absence of any added co-solvent for diphenylamine and water, or solvent for the diphenylamine itself, the presence of which in previous laboratory scale experiments was always believed to be essential for adequate residual film formation.

The finely divided diphenylamine should be of such particle size that essentially the maximum dimension of the particles is approximately 250 microns, and that the major proportion of the finely divided diphenylamine has a particle size below 150 microns. The presence of a small number of particles larger than 250 microns would not depart from the spirit of the invention, as they would merely be a comparatively ineffective diluent. It is preferable to use diphenylamine particle sizes which essentially have an approximate 75 microns maximum dimension or smaller in order to provide a large area of exposed total surface for coating or leaving a protective residue on the surfaces of the apples to be treated and to facilitate maintenance of a suspension or emulsion which is free from separation and settling for reasonably prolonged periods sufficient for proper use and application. The finely divided diphenylamine is most advantageously applied to the apples to be protected in a prewetted state since it has been found that under such conditions it is extremely active in producing a protective residual film.

The aqueous suspensions or emulsions employed according to the invention can be prepared in a number of ways. For example, the diphenylamine and water mixture can be put through a colloid mill, also ultrasonic vibrations can be made use of or any other intensive mechanical agitation and/or grinding serving to produce and disperse the finely divided diphenylamine in the water to result in a sufficiently stable dispersion of desired particle size can be employed. If desired, suspending or emulsifying agents can be added to render the dispersions more stable, but such additions are not necessary as even without such additions dispersions of useful stability can be attained. It merely, in some instances, may be desirable to subject such dispersions to slight agitation or stirring to maintain proper uniformity. The presence or absence of suspending or emulsifying agents in the diphenylamine suspensions or emulsions according to the invention has only a slight effect upon the formation of a protective, scald-preventive residual film on the surfaces of the apples which are treated. Suitable suspending or emulsifying agents, for example, are the synthetic commercially available surface active agents of the sulfate or sulfonate type, such as, for example, sodium lauryl sulfate, sodium dodecylbenzene sulfonate, sodium alkyl naphthalene sulfonate, long chain alkyl sulfonates, non-ionic surfactants such as the polyethoxyethanol esters and ethers of fatty acids and alcohols, and the like.

Such aqueous suspensions or emulsions may be made up in a concentrated form, containing from about 5% of diphenylamine up to 85 or 90 percent of this chemical. Obviously, in the upper ranges of such concentrated form, the suspension or emulsion may be so thick as to be a paste. The upper limit is determined solely by that amount at which the suspension can be reasonably well handled when it is so concentrated that it attains a thick, pasty consistency. These concentrates are diluted down as hereinafter more fully described, for application in accordance with the invention.

Alternatively, the diphenylamine may be finely powdered and reduced to particle sizes such as above described, and this fine powder may be admixed as desired with other powdered inert ingredients which may improve the free-flowing and shelf-storage characteristics of the material. Such inert ingredients may, for example, consist of various finely divided clays, talcs, kaolins, synthetic calcium silicates and calcium alumino-silicates, bentonites, fuller's earths, pumice, silica, chalk, magnesium carbonate, and other commonly available inert carriers. Surfactants may be added, if desired, so as to render the compositions more rapidly dispersible in water, but it is not necessary to do so. Such dry compositions may likewise be prepared in a range of concentrations of from about 5 percent to about 85 or 90 percent diphenylamine, and they are diluted down with and dispersed in water for use in accordance with the practice of the invention.

The diphenylamine suspensions or emulsions according to the invention which contain the diphenylamine in an active finely divided prewetted state are prepared simply by diluting down the more concentrated preparations above described with water so as to result in a suspension or emulsion containing from about 0.02 percent to about 1.0 percent of diphenylamine. In most instances, the preferred range of useful concentrations will be from about 0.1 to about 0.3 percent. These dilute diphenylamine suspensions or emulsions can be applied to the surfaces of apples for reducing and preventing the development of scald in a number of ways, such as, for example, by spraying the suspensions or emulsions on to the apples while the latter are still on the tree prior to harvest, or by spraying the suspensions or emulsions on to the apples after they have been harvested, or during grading, or after packing, or the apples may simply be dipped in the suspensions or emulsions and then allowed to drain and dry or placed wet in the storage rooms. The particular manner in which these suspensions or emulsions are applied will in some degree determine the most effective concentration of finely divided active diphenylamine suspension or emulsion to be used. Thus, for example, in using tree sprays prior to harvest, where there is bound to be less efficient use of the material being applied as compared with sprays directed on to the harvested fruit itself, or as compared to the use of a fruit dip as the means of fruit treatment, higher concentrations are generally required than when more efficient means of application are chosen. In general, for tree sprays, concentrations of the order of 0.3 percent or higher may be desirable, whereas for dip treatments concentrations of the order of 0.1 to 0.2 percent are preferred. Even higher concentrations may be required for effective prevention or reduction of scald incidence in the case of tree sprays in some instances, depending upon such factors as the output of the spray machinery, the pattern of coverage, and the speed at which the spray equipment is drawn through the orchard.

Typical scald-reducing and scald-preventing concentrate compositions and examples of the use of these compositions in the practice of this invention are shown below. These examples illustrate the superior effectiveness of the process according to the invention and the extraordinary scald protection afforded by the method of the invention, it being understood that these are cited for purposes of illustration only, and not for purposes of limitation.

*Example 1*

Diphenylamine crystals (2 lb.) of over 99 mole percent purity (this is the material used in all of the examples) was placed in a ball mill with 38 lb. of water, and the mixture was tumbled for 48 hours. The resulting fine suspension was screened to separate particles larger than 250 microns. Only a minute quantity was retained on the screen. The suspension of diphenylamine settled slowly upon standing, and redispersed readily upon gentle agitation.

A 100 gallon batch of dilute diphenylamine suspension was prepared by diluting 3.3 lb. of this 5% concentrate with water to result in a final diphenylamine concentration of 0.02% by weight. One hundred freshly harvested R.I. Greening apples were sprayed with this suspension until thoroughly wet to the point of run-off, and placed in storage at 0° C. and 90 percent relative humidity. The apples were removed after 125 days, held at room temperature (20°–22° C.) for 7 days and then were examined for scald incidence.

For comparison, 100 freshly harvested untreated apples of the same variety (control #1), and 100 freshly harvested apples of the same variety sprayed with a 0.02% diphenylamine solution prepared by diluting a solution of 75 grams diphenylamine in 1500 ml. of 95% ethyl alcohol with 100 gallons of water (control #2) were placed under identical storage conditions and examined for scald incidence in the identical manner as the test apples. The following results were observed:

|             | Percent Scald | Percent Scald Control |
|-------------|---------------|-----------------------|
| Test apples | 44            | 55.6                  |
| Control #1  | 99            | 0                     |
| Control #2  | 78            | 21.2                  |

Example 2

Diphenylamine crystals (1.5 lbs.) and 3.5 lbs. water plus 0.005 lb. of a commercial octylphenoxy polyethoxyethanol surfactant plus 0.005 lb. of a commercial silicone anti-foaming agent were subjected to the action of a high speed rotary mechanical agitator producing high shear. An extremely fine suspension resulted, which was shown on screening to contain only particles smaller than 150 microns. This suspension was very stable, settling out only after long standing, and redispersing with great readiness.

A 100 gallon batch of dilute diphenylamine suspension was prepared by diluting 1.4 lb. of this 30% concentrate with water to result in a final diphenylamine concentration of 0.05% by weight. One hundred freshly harvested Rome Beauty apples were sprayed with this suspension until thoroughly wet to the point of run-off, and placed in storage of 0° C. and 90 percent relative humidity. The apples were removed after 125 days, held at room temperature (20°–22° C.) for 7 days and then were examined for scald incidence.

For comparison, 100 freshly harvested untreated Rome Beauty apples (control #1), and 100 freshly harvested apples of the same variety sprayed with 0.05% diphenylamine solution prepared by diluting a solution of 188 grams diphenylamine in 3500 ml. of 95% ethyl alcohol containing 2 grams of the same commercial octylphenoxy polyethoxyethanol surfactant and 2 grams of the same commercial silicone anti-foaming agent with 100 gallons of water (control #2) were placed under identical storage conditions and examined for scald incidence in the identical manner as the test apples. The following results were observed:

|             | Percent Scald | Percent Scald Control |
|-------------|---------------|-----------------------|
| Test apples | 22            | 75.8                  |
| Control #1  | 91            | 0                     |
| Control #2  | 76            | 16.5                  |

Example 3

A mixture of 1.7 lb. diphenylamine and 2.3 lb. of water plus 0.004 lb. of a commercial surfactant comprising polyethoxyethanol ester of tall oil fatty acids was heated to 75° C. and subjected to the action of a high speed rotary agitator to produce an extremely fine emulsion. Agitation was continued while allowing the emulsion to cool to 25° C. There resulted a somewhat viscous, highly stable emulsion of diphenylamine, a small aliquot of which upon diluting with water and screening was found to contain substantially all particles smaller than 75 microns.

A 100 gallon batch of dilute diphenylamine emulsion was prepared by diluting 2.0 lb. of this 42% concentrate with water to result in a final diphenylamine concentration of 0.1% by weight. One hundred freshly harvested apples of the Baldwin variety were placed in wooden boxes and were dipped momentarily in this dilute emulsion, while agitating or swirling gently to avoid any air pockets or bubbles which might interfere with good contact of the emulsion with the apples. The apples were then removed and placed wet, after draining for a few minutes, directly into storage at 0° C. and 90 percent relative humidity. The apples were removed after 125 days, held at room temperature (20°–22° C.) for 7 days and then were examined for scald incidence.

For comparison, 100 freshly harvested untreated Baldwin apples (control #1), and 100 freshly harvested apples of the same variety dipped in the identical manner in a 0.1% diphenylamine solution prepared by diluting a solution of 380 grams diphenylamine in 1000 ml. of 95% ethyl alcohol containing 9 grams of the same commercial surfactant described above (comprising polyethoxyethanol ester of tall oil fatty acids) with 100 gallons of water (control #2) were placed under identical storage conditions and examined for scald incidence in the identical manner as the test apples. The following results were observed:

|             | Percent Scald | Percent Scald Control |
|-------------|---------------|-----------------------|
| Test apples | 1             | 99                    |
| Control #1  | 99            | 0                     |
| Control #2  | 34            | 65                    |

Example 4

A mixture of 2 lb. diphenylamine crystals, 7.7 lb. of a commercially available insecticidal diluent grade of kaolin and 0.3 lb. of a commercial grade of surfactant containing sodium alkylnapthalene sulfonate was ground in a ball mill until a small sample upon dispersing in water and screening showed all particles to be smaller than 150 microns and over 80 percent of the particles to be smaller than 50 microns. The resulting composition was very readily dispersible in water and gave highly suitable suspensions for treating apples.

A 100 gallon batch of dilute diphenylamine suspension was prepared by diluting 8.3 lb. of this 20% concentrate with water to result in a final diphenylamine concentration of 0.2% by weight. One hundred freshly harvested Cortland apples were placed in wooden boxes and were dipped momentarily in this dilute suspension, while agitating or swirling gently to avoid any air pockets or bubbles which might interfere with good contact of the suspension with the apples. The apples were removed and drained for a few minutes, then placed directly into storage at 0° C. and 90 percent relative humidity. The apples were removed after 110 days, held at room temperature (20°–22° C.) for 6 days and then were examined for scald incidence.

For comparison, 100 freshly harvested Cortland apples (control #1), and 100 freshly harvested Cortland apples dipped in the identical manner in 0.2% diphenylamine solution prepared by diluting a solution of 750 grams diphenylamine in 5 liters of 95% ethyl alcohol containing 100 grams of the same commercial sodium alkylnaphthalene sulfonate with 100 gallons of water (control #2), were placed under identical storage conditions and examined for scald incidence in the identical manner as the test apples. The following results were observed:

|  | Percent Scald | Percent Scald Control |
|---|---|---|
| Test apples | 3 | 96.9 |
| Control #1 | 96 | 0 |
| Control #2 | 17 | 82.3 |

(NOTE.—There was severe lenticel injury to the apples of control #2.)

*Example 5*

A mixture of 4.2 lb. diphenylamine crystals and 5.8 lb. of a finely divided attapulgite diluent was passed through a high speed hammer mill twice to produce a powdered product forming very stable dispersions in water which settle out only after long standing. Aqueous dispersions of pre-wet diphenylamine particles thus prepared were shown to contain 90 percent of the particles smaller than 50 microns and no particles larger than 250 microns.

A 100 gallon batch of dilute diphenylamine suspension was prepared by diluting 6.0 lbs. of this 42% concentrate with water to result in a final diphenylamine concentration of 0.3% by weight. One hundred apples of the variety Wealthy were harvested starting two hours after spraying the trees with this suspension, and the apples were placed in storage at 0° C. and 90 percent relative humidity. The apples were removed after 93 days, held at room temperature (20°–22° C.) for 7 days, then examined for scald incidence.

For comparison, 100 apples of the same variety picked from trees sprayed with plain water (control #1) and 100 apples of the same variety picked from trees sprayed in the identical fashion with a 0.3% solution of diphenylamine prepared by diluting a solution of 1135 grams diphenylamine in 5 liters of 95% ethyl alcohol with 100 gallons of water (control #2) were placed under identical storage conditions and examined for scald incidence in the identical manner as the test apples. The following results were observed:

|  | Percent Scald | Percent Scald Control |
|---|---|---|
| Test apples | 4 | 95.5 |
| Control #1 | 90 | 0 |
| Control #2 | 22 | 75.5 |

(NOTE.—There was slight injury to foliage and fruit in the instance of the test apples, but not enough to be of economic importance; there was moderate injury to the fruit and slight to moderate injury to the foliage in the control #2 test.)

*Example 6*

A mixture of 8.3 lb. diphenylamine, 1.0 lb. diatomaceous earth, 0.3 lb. powdered sodium alkylnaphthalene sulfonate and 0.4 lb. powdered commercial formulation of alkylphenoxypolyethoxy ethanol were ground together in a high speed air attrition mill. There resulted a finely powdered product which suspended quite readily in water. Particle size examination of water suspensions of this composition showed less than 2% of the particles to be larger than 250 microns, less than 5% to be larger than 75 microns and over 95% of the particles to be smaller than 44 microns.

A 100 gallon batch of dilute diphenylamine suspension was prepared by diluting 5.0 lb. of this 83% concentrate with 100 gallons of water to result in a final diphenylamine concentration of 0.5 by weight. One hundred Cortland apples were harvested starting one hour after spraying the trees sparingly with this dilute suspension, and the apples were immediately placed in storage at 0° C. and 90 percent relative humidity. The apples were removed after 120 days, held at room temperature (20°–22° C.) for 7 days, then examined for scald incidence.

For comparison, 100 apples of the same variety picked from trees sprayed with plain water (control #1), and 100 apples of the same variety picked from trees sprayed in the identical manner with a 0.5% solution of diphenylamine prepared by diluting a solution of 4.2 lbs. diphenylamine in 3 gallons of ethyl alcohol with 97 gallons of water (control #2) were placed under identical storage conditions and examined for scald incidence in the identical manner as the test apples. The following results were observed:

|  | Percent Scald | Percent Scald Control |
|---|---|---|
| Test apples | 38 | 56.8 |
| Control #1 | 88 | 0 |
| Control #2 | 70 | 20.5 |

(NOTE.—There was moderate to slight injury to foliage and to fruit in the instance of the test apples; there was severe injury to the fruit and moderate injury to the foliage in the control #2 test.)

I claim:

1. The method of controlling apple storage scald which comprises applying to apples an effective amount of a scald reducing composition containing at least 0.02% of diphenylamine as the essential active ingredient, said diphenylamine being in an essentially organic solvent-free aqueous dispersion in finely divided form such that essentially the maximum dimension of the diphenylamine particles is up to 250 microns, and the major proportion of the diphenylamine particles have a particle size below 250 microns.

2. The method of controlling apple storage scald which comprises applying to apples an effective amount of a scald reducing composition containing at least 0.02% of diphenylamine as the essential active ingredient, said diphenylamine being in an essentially organic solvent-free aqueous dispersion in finely divided form such that essentially the major proportion of said diphenylamine consists of particles having a maximum dimension up to 150 microns and only a minor proportion of said diphenylamine consists of particles having a maximum dimension up to 250 microns.

3. The method of controlling apple storage scald which comprises applying to apples an effective amount of a scald reducing composition containing at least 0.02% of diphenylamine as the essential active ingredient, said diphenylamine being in an essentially organic solvent-free aqueous dispersion in finely divided form such that essentially the major proportion of said diphenylamine consists of particles having a maximum dimension up to 75 microns, and only a minor proportion of said diphenylamine consists of particles having a maximum dimension up to 250 microns.

4. An apple scald reducing composition which comprises a dry, water-dispersible, organic solvent-free, finely divided and highly purified diphenylamine in intimate admixture with an inert carrier, said composition having a particle size distribution such that essentially the maximum dimension of the particles is up to 250 microns and the major proportion of the particles have a particle size dimension of less than 250 microns and containing from about 5% to about 90% by weight of said diphenylamine.

5. An apple scald reducing composition which comprises a dry, water-dispersible, organic solvent-free, finely divided and highly purified diphenylamine in intimate admixture with an inert carrier, said composition having a particle size distribution such that essentially the maximum dimension of the particles is up to 250 microns and the major proportion of the particles have a particle size dimension of less than 150 microns and containing from about 5% to about 90% by weight of said diphenylamine.

6. An apple scald reducing composition which comprises a dry, water-dispersible, organic solvent-free, finely divided and highly purified diphenylamine in intimate admixture with an inert carrier, said composition having a particle size distribution such that essentially the maximum dimension of the particles is up to 250 microns and the major proportion of the particles have a particle size dimension of less than 75 microns and containing from about 5% to about 90% by weight of said diphenylamine.

References Cited in the file of this patent

UNITED STATES PATENTS

| | | |
|---|---|---|
| 1,817,958 | Zwilgmeyer | Aug. 11, 1931 |
| 2,954,314 | Metzger | Sept. 27, 1960 |